United States Patent
Wei et al.

(10) Patent No.: US 12,528,268 B2
(45) Date of Patent: Jan. 20, 2026

(54) SPACER FABRIC STRUCTURED GARMENT

(71) Applicants: SANLIUYIDU (CHINA) CO., LTD., Fujian (CN); SANLIUYIDU (FUJIAN) SPORTS GOODS CO., LTD., Fujian (CN)

(72) Inventors: Shutao Wei, Fujian (CN); Keqin Wang, Fujian (CN); Huilian Dai, Fujian (CN); Jiahong Jiang, Fujian (CN); Shaohua Lan, Fujian (CN)

(73) Assignees: SANLIUYIDU (CHINA) CO., LTD., Quanzhou (CN); SANLIUYIDU (FUJIAN) SPORTS GOODS CO., LTD., Quanzhou (CN)

(*) Notice: Subject to any disclaimer, the term of this patent is extended or adjusted under 35 U.S.C. 154(b) by 324 days.

(21) Appl. No.: 18/020,644

(22) PCT Filed: Jun. 28, 2022

(86) PCT No.: PCT/CN2022/101899
§ 371 (c)(1),
(2) Date: Feb. 10, 2023

(87) PCT Pub. No.: WO2023/142364
PCT Pub. Date: Aug. 3, 2023

(65) Prior Publication Data
US 2024/0278525 A1   Aug. 22, 2024

(30) Foreign Application Priority Data
Jan. 28, 2022   (CN) .......................... 202210108025.8

(51) Int. Cl.
*A41D 31/102*   (2019.01)
*A41D 31/06*    (2019.01)
(Continued)

(52) U.S. Cl.
CPC .................. *B32B 5/02* (2013.01); *B32B 3/12* (2013.01); *B32B 5/26* (2013.01); *B32B 7/02* (2013.01);
(Continued)

(58) Field of Classification Search
CPC ....... A41D 31/102; A41D 31/065; B32B 3/12
(Continued)

(56) References Cited

U.S. PATENT DOCUMENTS

2009/0155543 A1*  6/2009  Fowler ................. A41D 31/065
                                                    428/179
2010/0024125 A1*  2/2010  Li .......................... A47G 9/086
                                                    5/413 R
(Continued)

FOREIGN PATENT DOCUMENTS

CN          102529199 A  *  7/2012  ............... A47G 9/02

OTHER PUBLICATIONS

Machine_english_translation_CN_102529199_A; Lap Li Yick; Insulating Product and its Manufacturing Method; Jul. 4, 2012; EPO; whole document (Year: 2025).*

*Primary Examiner* — Tahseen Khan (57) ABSTRACT

The present invention discloses a spacer fabric structured garment, which comprises a garment body, a plurality of filling cavities arranged in the garment body, and spacer fabrics arranged in the filling cavities, wherein the spacer fabrics comprise a plurality of dragging units, and the dragging units comprise an upper surface layer, a lower surface layer and a dragging part connected to one side of the upper surface layer and the lower surface layer which are close to each other. The present invention has the advantage that the spacer fabrics can be used to prevent the filling materials in the filling cavities from piling up.

20 Claims, 5 Drawing Sheets

(51) Int. Cl.
    *B32B 3/12*       (2006.01)
    *B32B 5/02*       (2006.01)
    *B32B 5/26*       (2006.01)
    *B32B 7/02*       (2019.01)
    *B32B 7/05*       (2019.01)
    *B32B 37/12*     (2006.01)
    *B32B 38/00*     (2006.01)
    *A41D 31/00*    (2019.01)

(52) U.S. Cl.
    CPC ............... *B32B 7/05* (2019.01); *B32B 37/12* (2013.01); *B32B 38/0004* (2013.01); *A41D 31/0005* (2013.01); *A41D 31/06* (2019.02); *B32B 2305/18* (2013.01); *B32B 2307/72* (2013.01); *B32B 2307/7375* (2023.05); *B32B 2437/00* (2013.01)

(58) Field of Classification Search
    USPC ........................................................ 428/131
    See application file for complete search history.

(56) References Cited

U.S. PATENT DOCUMENTS

2017/0297371 A1\* 10/2017 Sportelli .................... B32B 5/18
2019/0269188 A1\*  9/2019 Ridley ....................... B32B 5/26
2019/0297974 A1\* 10/2019 Takayanagi ............ D03D 11/00

\* cited by examiner

SPACER FABRIC STRUCTURED GARMENT

TECHNICAL FIELD

The present invention relates to the technical field of apparel fabrics, and in particular to a spacer fabric structured garment.

BACKGROUND ART

People often wear garment to protect themselves from the cold in winter, which includes down garments filled with down and other warm materials in the fabric.

The existing down jacket includes a garment body and filling material, the garment body is provided with a number of filling cavities, the filling material is filled in the filling cavities.

However, the down jacket in the process of wearing, due to the impact of strenuous movement or due to the gravity of the filling material itself, there will be filling material piled up in the corners of the filling cavity, resulting in filling material can not be evenly laid in the filling cavity, resulting in reduced warmth, while in the appearance of the filling material piled up phenomenon will destroy the smoothness of the surface of the garment, resulting in uneven thickness of garment, and thus affect the aesthetics. In turn, it affects the beauty.

In view of this, how to prevent the accumulation of filling material inside the filling cavity is a technical problem to be solved by those skilled in the art.

SUMMARY

The purpose of the present invention is to provide a spacer fabric structured garment.

The present invention is to solve the problem of reduced warming effect of garments caused by the phenomenon of accumulation of filling materials inside the garments.

To solve the above problems, the technical solutions of the present invention are as follows:

A spacer fabric structured garment, comprising a garment body and a number of filling cavities opened within the garment body, further comprising a spacer fabric provided within the filling cavities, the spacer fabric comprising a number of dragging units, the dragging units comprising an upper surface layer, a lower surface layer and a dragging part attached to the side of the upper surface layer and the lower surface layer near each other.

Further, the upper surface layer of each the dragging unit is integrally formed as an upper fixed surface and the lower surface layer of each the dragging unit is integrally formed as a lower fixed surface, the upper fixed surface and the lower fixed surface being fixed to the upper surface and lower surface of the interior of the filling cavity, respectively.

Further, the dragging unit has a square or diamond cross-section.

Further, the side lengths of the upper and lower layers are in the range of 1 cm to 3 cm.

Further, the upper and lower surface layers both comprise an outer ring part and a middle part, the outer ring part being located on the outer peripheral side of the middle part, the dragging part being provided between the outer ring parts of the upper and lower surface layers.

Further, the middle part is provided with hollow; and/or is made of a thinner material; and/or is made of the same material as the outer ring part.

Further, the outer ring part has a width in the range of 3 mm to 7 mm.

Further, the dragging part comprises a number of dragging wires, the dragging wires being monofilament dragging wires, textile dragging wires or a combination of monofilament dragging wires and textile dragging wires.

Further, the length of the dragging wire is within the range of 1 cm to 3 cm.

Further, the method of production, comprising the following steps:
- S1: Cut the shape and size of the filling cavity according to the need of the garment body;
- S2: The upper fixed surface and the lower fixed surface of the spacer fabric are compounded with an adhesive layer on the side away from each other to produce an adhesive member;
- S3: According to the specifications of several outer ring and middle parts on the upper and lower fixed surfaces of the spacer fabric, the adhesive layer on the adhesive member is cut, and the location of the adhesive layer corresponding to the outer ring part is retained, and the location of the adhesive layer corresponding to the middle part is removed;
- S4: Hot press lamination of the bonding member having a cut and finished bonding layer with the filling cavity of the garment body;
- S5: Filling material is filled between the dragging units through the cross section of the dragging units until the spacer fabric is filled;
- S6: Tap the filling cavity so that the filling material is evenly distributed in the filling cavity.

Compared with the prior art, the present invention has the following beneficial effects:

1. By providing the spacer fabric, the spacer fabric is bonded and fixed inside the filling cavity, and the spacer fabric includes an upper fixed surface, a lower fixed surface, and a dragging part attached to the side of the upper fixed surface and the lower fixed surface near each other, and the upper fixed surface and the lower fixed surface are fixed to the upper surface and the lower surface inside the filling cavity, respectively, and the distance between the upper fixed surface and the lower fixed surface of the spacer fabric can be maintained by the dragging part through the above structure. The maximum thickness of the filling cavity is also controlled by the dragging part, so that when filling the filling material into the spacer fabric, the filling material is restricted by the fixed space formed by the upper fixed surface and the lower fixed surface and the dragging part, and the accumulation of the filling material can be prevented, thus ensuring the warmth effect of the garment body;

2. By arranging the dragging unit, which comprises an upper surface layer and a lower surface layer, and part of the dragging parts are arranged on one side of the upper surface layer and the lower surface layer which are close to each other, wherein the cross section of the dragging unit is square or rhombic, and the dragging unit is communicated with other dragging units which are adjacent to each other, so that the filling material can be sequentially filled into each dragging unit when moving in the spacer fabric. The areas of the upper surface layer and the lower surface layer of each drawing unit and the length of the dragging part are the same, so that after the spacer fabric is filled with the filling material, the filling material can be evenly distributed in each drawing unit, so that the symmetry of the filling material distribution of the garment body can be maintained;

3. By arranging the dragging parts, which are composed of several dragging wires, the dragging parts are located at the four end points corresponding to the upper surface layer and the lower surface layer of the dragging unit. After the filling material fills the inside of the spacer fabric, the dragging parts can restrict the movement of the filling material. Specifically, after the filling material enters the dragging unit, the dragging parts restrict the movement of the filling material in four directions of the dragging unit, and the upper surface layer and the lower surface layer have a fixed height to squeeze the filling material.

4. By setting the dragging wire, the dragging wire is a monofilament dragging wire, textile dragging wire or a combination of monofilament dragging wire and textile dragging wire, the length of which is in the range of 1 cm to 3 cm, preferably 2 cm, the selection of monofilament dragging wire, textile dragging wire or a combination of monofilament dragging wire and textile dragging wire can increase the toughness and hardness of the dragging wire, can reduce the situation of the dragging wire being pulled by external forces and breaking, can reduce the filling material in the process of filling. It is possible to reduce the breakage of the dragging wire by resistance during the process of filling the spacer fabric, and to prevent the breakage of the filling material by bulging after the spacer fabric is filled;

5. By setting the middle part and the outer ring part, when the middle part and the outer ring part use different materials, i.e., the middle part uses a thinner density material or is directly set to hollow, the overall weight of the spacer fabric can be reduced, as well as the material consumed when pasting, so that the overall weight of the garment body can be reduced;

6. In the production process, the bonding member is only provided at the outer ring part of the upper and lower surface layers, keeping the middle part uncompounded with the bonding layer, thus being able to maintain the breathable effect of the garment body.

Note:
1. Garment body; 2. Filling cavity; 3. Spacer fabric; 4. Dragging unit; 5. Upper fixed surface; 51. Upper surface layer; 6. Lower fixed surface; 61. Lower surface layer; 7. Dragging part; 71. Dragging wire; 8. Outer ring part; 9. Middle part; 10. Filling channel.

EMBODIMENTS

The present invention proposes a new scheme to solve the problem of reduced warmth caused by the down jacket running down.

For a clearer representation, the following is a detailed description of the present invention in combination with the attached drawings.

Embodiment I, referring to FIG. 1 to FIG. 4, the present invention provides a spacer fabric structured garment, which comprises a garment body 1 and a filling cavity 2 arranged in the garment body 1, wherein the garment body 1 is composed of fabric and lining, and a plurality of filling cavities 2 are formed by sewing the fabric and lining in the air route, and spacer fabrics 3 are fixedly installed in the filling cavity 2. The spacer fabric 3 includes an upper fixed surface 5, a lower fixed surface 6 located below the upper fixed surface 5, and a dragging part 7 fixedly connected to one side of the upper fixed surface 5 and the lower fixed surface 6 close to each other, wherein the upper fixed surface 5 and the lower fixed surface 6 of the spacer fabric 3 are respectively combined with the upper surface and the lower surface of the filling cavity 2 by hot pressing. The space between the upper fixed surface 5 and the lower fixed surface 6 of the spacer fabric 3 is the filling channel 10, and the filling material is filled in the filling channel 10.

The distance between the upper fixed surface 5 and the lower fixed surface 6 of the spacer fabric 3 is controlled by the dragging part 7, so the filling space of the filling cavity 2 is also controlled by the dragging part 7. Therefore, when filling the spacer fabric 3 with the filling material, the filling material is limited by the space formed by the upper fixed surface 5, the lower fixed surface 6 and the dragging part 7. After the spacer fabric 3 is filled with the filling material, the phenomenon that the filling material moves and accumulates can be prevented, and correspondingly, the filling cavity 2 can be maintained at a fixed thickness.

The spacer fabric 3 includes a number of dragging units 4, a single dragging unit 4 includes an upper layer 51 and a lower layer 61 and part of the dragging part 7, part of the dragging part 7 is connected to the side of the upper layer 51 and the lower layer 61 close to each other, wherein the adjacent dragging units 4 are connected to form a filling channel 10, a number of filling channels 10 are connected to each other. The upper fixed surface 5 of the spacer fabric 3 is formed in one piece by a plurality of upper surface layer 51, and the lower fixed surface 6 is formed in one piece by a plurality of lower surface layers 61.

Several dragging units 4 are connected to each other, when the filling material moves in the spacer fabric 3, it can be filled into each dragging unit 4 in turn, the area of the upper surface layer 51 and lower surface layer 61 of each dragging unit, the length of the dragging part 7 are the same, so it can ensure that after the spacer fabric 3 is filled with the filling material, the filling material can be more uniformly distributed in each dragging unit 4, so as to maintain The filling material in the garment body 1 is distributed evenly.

Figure 4:
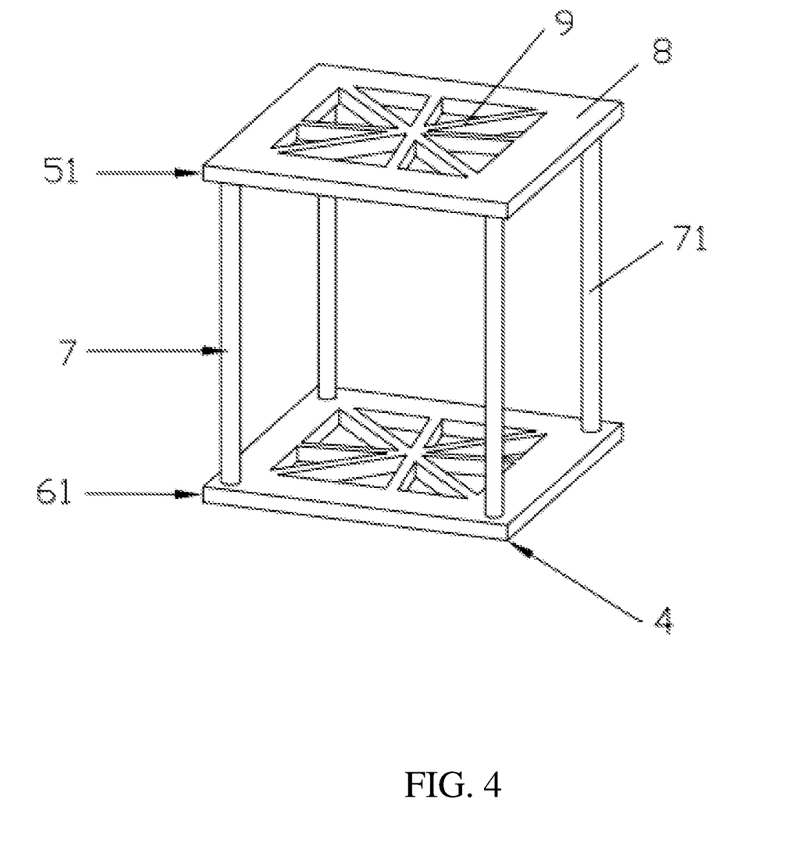
FIG. 4 shows a schematic diagram of the structure of the dragging unit of Embodiment I of the present invention.

It should be noted that the cross-section of the dragging unit 4 is a square or diamond with equal sides, and the side length is between 1 cm and 3 cm, preferably with a side length of 2 cm. The filling material can be moved relatively easily within the filling channel 10 during the movement process.

Figure 1:
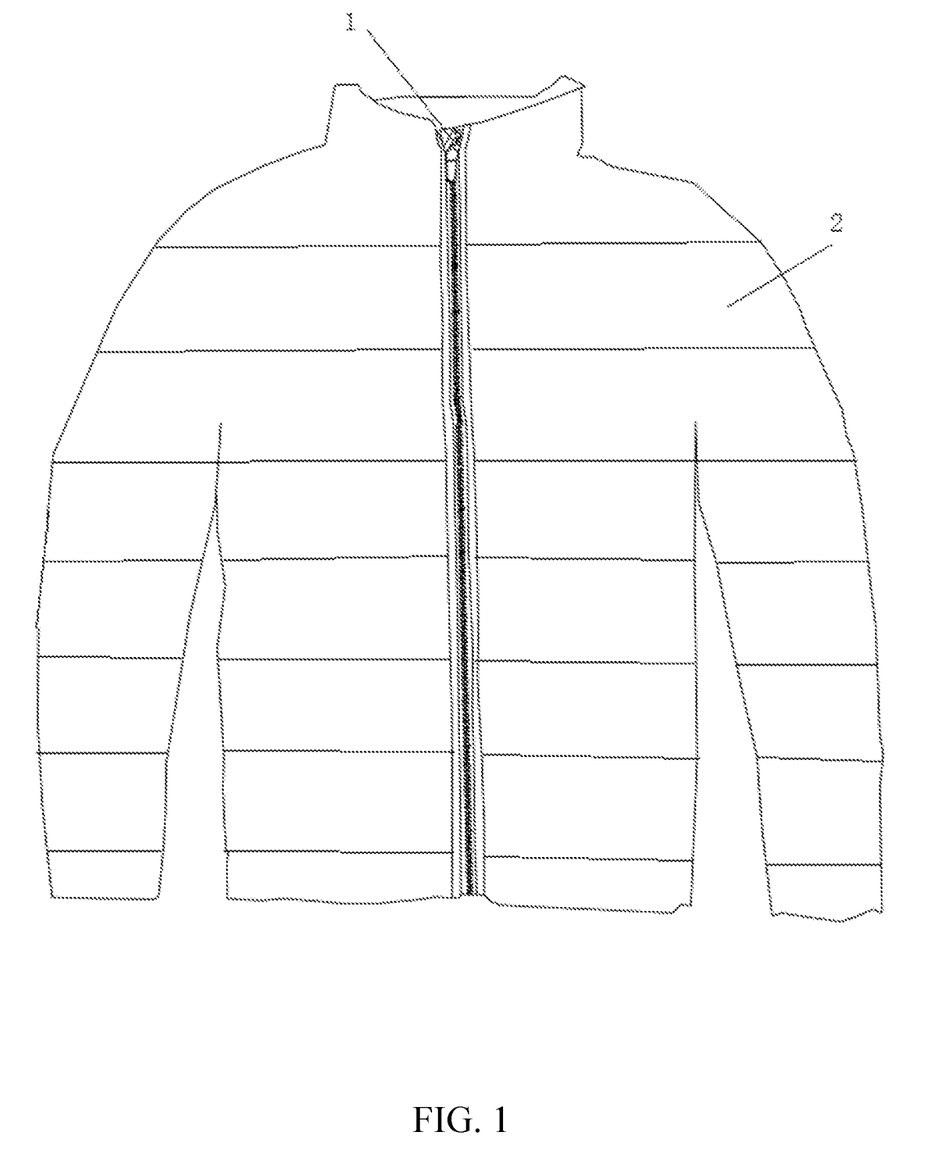
FIG. 1 shows a schematic diagram of the overall structure of the present invention.
Figure 2:
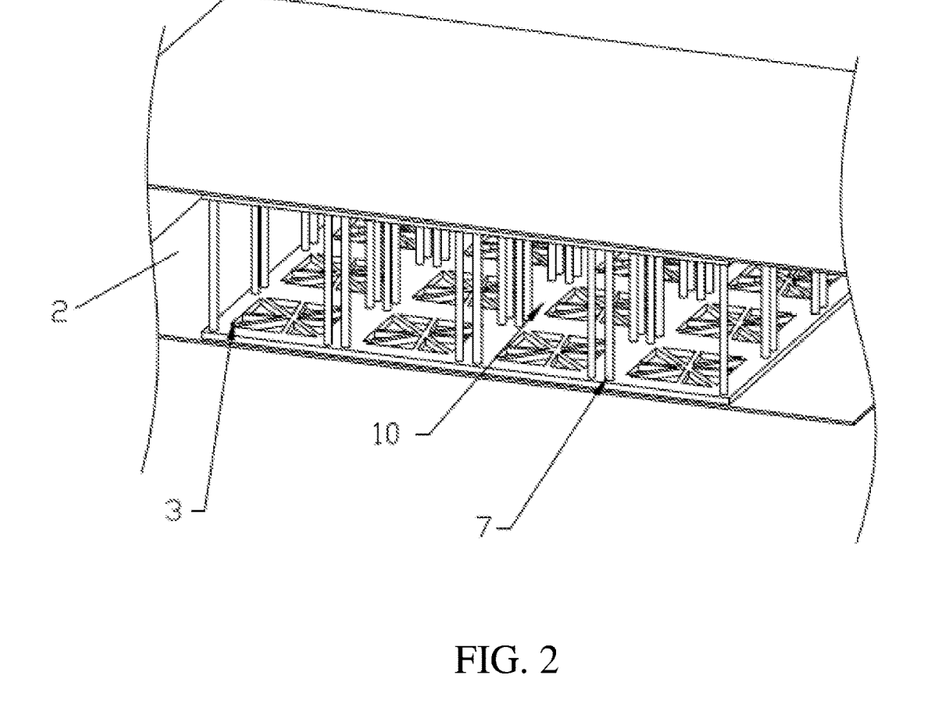
FIG. 2 is a schematic diagram of the partial structure of the filling cavity of embodiment I of the present invention.
Figure 3:
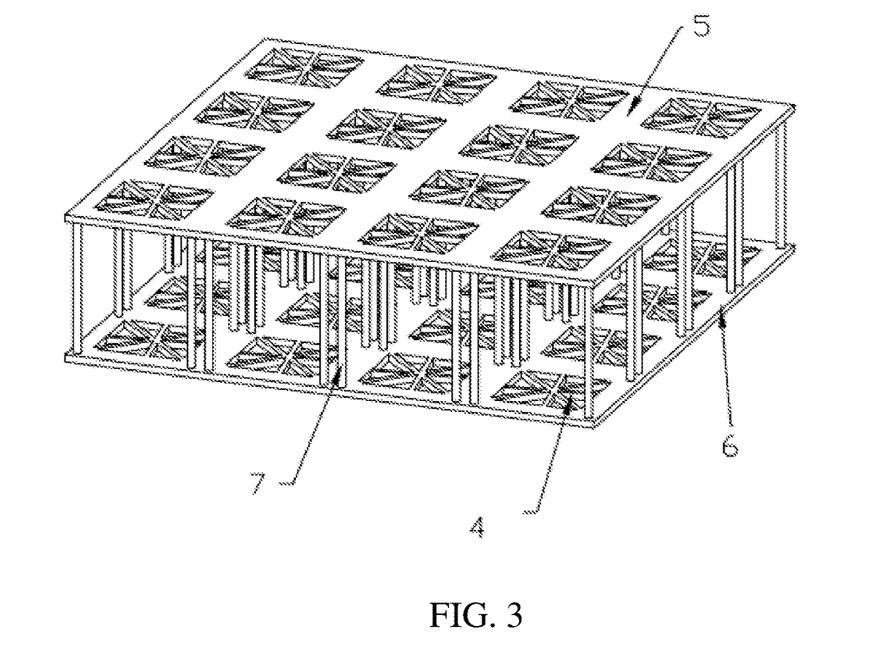
FIG. 3 is a schematic diagram of the structure of the spacer fabric of Embodiment I of the present invention.

On the basis of the above embodiment, the dragging part 7 is composed of a number of dragging wires 71, the material of the dragging wire 71 is monofilament dragging wire, textile dragging wire or a combination of monofilament dragging wire and textile dragging wire, the length of the dragging wire 71 ranges from 1 cm to 3 cm, preferably the length is 2 cm, where the dragging wire 71 is connected at the corresponding four end points of the upper surface layer 51 and the lower surface layer 61 towards the close side.

The presence of the dragging wire 71 is able to limit the movement of the filling material, as shown by the fact that, after the filling material enters the dragging unit 4, the dragging wire 71 limits the movement of the filling material in the four directions of the dragging unit 4, plus by the fact that the upper surface layer 51 and the lower surface layer 61 have a fixed height and squeeze the filling material, which is more difficult to move after filling the spacer fabric 3, thus preventing a The pile-up effect is prevented.

The material can increase the toughness and hardness of the dragging wire 71, and can reduce the occurrence of the dragging wire 71 breaking due to external dragging, the occurrence of the dragging wire 71 breaking due to resistance during the filling of the filling material into the spacer fabric 3, and the occurrence of the dragging wire 71 breaking due to bulging of the filling material after the filling of the spacer fabric 3 is completed.

In the final effect of the demonstration, the filling space of the filling cavity 2 is affected by the thickness of the spacer fabric 3 and the total volume of the filling material, and the spacer fabric 3 can maintain a certain distance under the action of the dragging wire 71. When filling the spacer fabric 3, the filling material is preferably down, and the space occupied by the spacer fabric 3 can be limited by the dragging part 7 to keep the maximum distance between the upper fixed surface 5 and the lower fixed surface 6 of the spacer fabric 3 from changing, so that the down can be evenly distributed to each dragging unit 4 after the filling in the spacer fabric 3, thus preventing the occurrence of down running. The overall warming effect of the garment body 1 is maintained.

Wherein, both the upper surface layer 51 and the lower surface layer 61 include an outer ring part 8 and a middle part 9, the outer ring part 8 being located on the outer periphery of the middle part 9, the outer ring part 8 being box-shaped and having a width designed to be between 3 mm and 7 mm, preferably 5 mm. The dragging wire 71 of the dragging unit 4 is fixed at the four end points of the outer ring part 8 corresponding to the upper surface layer 51 and the lower surface layer 61.

It should be noted that the middle part 9 is designed to be hollowed out to reduce the overall weight of the spacer fabric 3 to save the material used in production, and to reduce the material used in pasting, thus reducing the overall weight of the garment body 1.

Embodiment II

Figure 5:
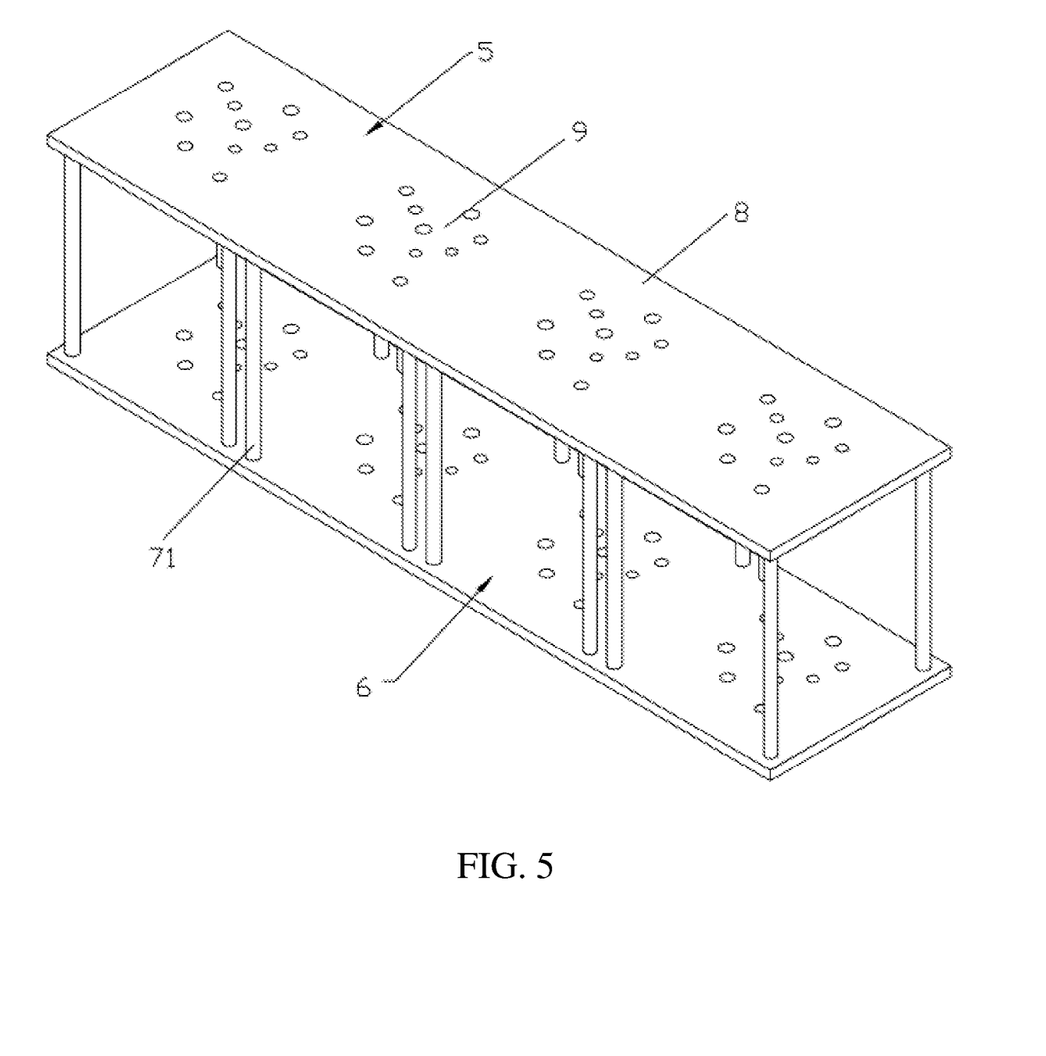
FIG. 5 is a schematic diagram of the structure of the spacer fabric of Embodiment II of the present invention.

The difference with Embodiment I is that, with reference to FIG. 5, the middle part 9 is made of a material with a thinner density compared with the outer ring part 8.

By designing the middle part 9 as a different material from the outer ring part 8, although both are used as textile materials, the density of the middle part 9 is lower than that of the outer ring part 8, so the weight of the spacer fabric is similarly reduced.

Embodiment III

Figure 6:
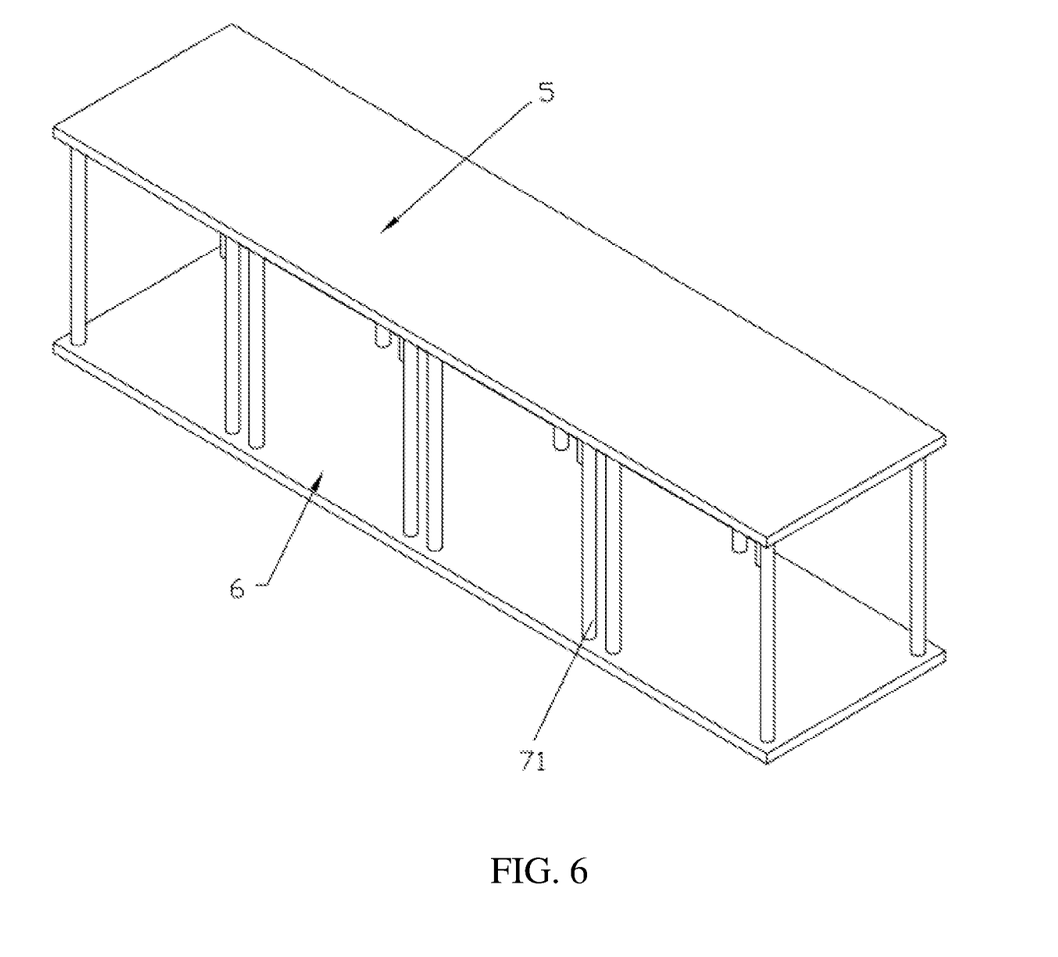
FIG. 6 shows a schematic diagram of the structure of the spacer fabric of embodiment III of the present invention.

The difference with Embodiment I and Embodiment II is that: referring to FIG. 6, the middle part 9 and the outer ring part 8 are the same material, which is mainly to facilitate the spacer fabric 3 to fit in the filling cavity 2 and to prevent the filling material from leaking out of the inside of the spacer fabric 3.

The making method of the present invention is divided into 6 steps:
  (1) The shape and size of the filling cavity 2 are cut according to the needs of the garment body 1;
  (2) The upper fixed surface 5 and the lower fixed surface 6 of the spacer fabric 3 are compounded with the adhesive layer on the side away from each other to produce an adhesive member;
  (3) According to the specifications of the upper fixed surface 5 of the spacer fabric 3 and a number of outer ring parts 8 and middle parts 9 on the lower fixed surface 6, the adhesive layer on the bonding member is cut, the adhesive layer corresponding to the location of the outer ring 8 is retained, and the adhesive layer corresponding to the location of the middle part 9 is removed;
  (4) Hot press lamination of the bonding member having a cut-out bonding layer with the filling cavity 2 of the garment body 1;
  (5) Fill the filling material between the dragging unit 4 through the cross section of the dragging unit 4 until it fills the spacer fabric 3;
  (6) The filling cavity 2 is tapped so that the filling material is evenly distributed in the filling cavity 2.

By the method shown above, the location of the bonding member is located on the spacer fabric 3, it is convenient to cut or electro-engrave the bonding layer on the bonding member, such as with the hollowed out middle part 9 in Embodiment I, the bonding layer can be cut in the cutting process corresponding to the location of the middle layer, which is more convenient, and reduces the use of bonding layer material, protects the breathable function of the garment body 1, and also reduces the weight of the garment body 1 in comparison The weight of the garment is reduced.

The above method is the most preferred method, in the process of pasting, the adhesive layer on the spacer fabric 3 can also be replaced with an adhesive film, and the upper and lower surfaces of the inner side of the filling cavity 2 are thermo compounded by the adhesive film.

In garment products that do not consider garment breathability, it is also possible to directly provide adhesive film between the upper surface layer 51 and the lower surface layer 61 of the spacer fabric 3, and heat-press lamination with the upper and lower surfaces of the inner side of the filling cavity 2 through the spacer fabric 3. This manufacturing process reduces the step of cutting or electric engraving of the adhesive layer on the adhesive member, reducing labor costs and shortening certain manufacturing time.

The working principle of the present invention is as follows: after the spacer fabric 3 is fixed and installed in the filling cavity 2, it is restricted by the dragging part 7 and the fixed space formed by the upper fixed surface 5 and the lower fixed surface 6, and after the filling material is filled in the spacer fabric 3, the thickness of the spacer fabric 3 can be kept constant, so that the filling material is evenly distributed inside the spacer fabric 3 to prevent the filling material from moving. The filling material can be evenly distributed inside the spacer fabric 3 to prevent the filling material from moving and maintain the warmth of the garment body 1.

The working principle and working process of this embodiment and other contents can refer to the corresponding contents of the preceding embodiment.

The same or similar parts between the above-mentioned embodiments in this specification can be cross-referenced, and each embodiment focuses on what is different from the other embodiments, but does not limit that their differences cannot be replaced or superimposed on each other.

The above embodiments are only used to explain the technical solution of the present invention and not to limit it. A person skilled in the art should understand that any modification and equivalent substitution that does not depart from the spirit and scope of the present invention shall fall within the scope of protection of the claims of the present invention.

What is claimed is:

1. A spacer fabric structured garment, comprising a garment body (1) and a number of filling cavities (2) opened in the garment body (1), a spacer fabric (3) provided in the filling cavities (2), the spacer fabric (3) comprising a number of dragging units (4), each dragging unit (4) comprising an upper surface layer (51) and a lower surface layer (61), as well as a dragging part (7) connected to one side of the upper surface layer (51) and one side of the lower surface layer (61) which are close to each other, wherein the dragging units (4) are connected adjacent to each other, forming a plurality of filling channels (10) that are communicated with each other.

2. The spacer fabric structured garment according to claim 1, wherein: the upper surface layer (51) of each of the dragging units (4) is integrally formed into an upper fixed surface (5), and the lower surface layer (61) of each of the dragging units (4) is integrally formed into a lower fixed surface (6), the upper fixed surface (5) and lower fixed surface (6) being fixed to an upper and a lower surface inside the filling cavities (2), respectively.

3. The spacer fabric structured garment according to claim 1, wherein: the dragging units (4) have a square or diamond-shaped cross-section.

4. The spacer fabric structured garment according to claim 2, wherein: side lengths of the upper surface layer (51) and lower surface layer (61) are in a range of 1 cm to 3 cm.

5. The spacer fabric structured garment according to claim 2, wherein: the upper surface layer (51) and lower surface layer (61) both comprise an outer ring part (8) and a middle part (9), the outer ring part (8) being located on the outer peripheral side of the middle part (9), the dragging part (7) being provided between the outer ring part (8) of the upper surface layer (51) and the lower surface layer (61).

6. The spacer fabric structured garment according to claim 5, wherein: the middle part (9) has a hollow portion.

7. The spacer fabric structured garment according to claim 5, wherein: a width of the outer ring part (8) is in a range of 3 mm to 7 mm.

8. The spacer fabric structured garment according to claim 1, wherein: the dragging part (7) comprises a number of dragging wires (71), the dragging wires (71) being monofilament dragging wires, textile dragging wires or a combination of monofilament dragging wires and textile dragging wires.

9. The spacer fabric structured garment according to claim 8, wherein: the dragging wire (71) has a length in a range of 1 cm to 3 cm.

10. A method for making a spacer fabric structured garment according to claim 1, comprising the steps of:
S1: cutting the shape and size of the filling cavity (2) according to the need of the garment body (1);
S2: the bonding layer is laminated on the side of the upper fixed surface (5) and the lower fixed surface (6) of the spacer fabric (3) that are away from each other to produce the bonded part;
S3: according to the specifications of the upper fixed surface (5) of the spacer fabric (3) as well as a number of outer ring parts (8) and middle parts (9) on the lower fixed surface, the adhesive layer on the adhesive member is cut, and the location of the adhesive layer corresponding to the outer ring (8) is retained, and the location of the adhesive layer corresponding to the middle part (9) is removed;
S4: the bonding member with the cut-out bonding layer is hot pressed and laminated to the filling cavity (2) of the garment body (1);
S5: filling material is charged between the dragging units (4) through the cross section of the dragging units (4) until the spacer fabric (3) is filled;
S6: tapping the filling cavity (2) so that the filling material is evenly distributed in the filling cavity (2).

11. A method for making a spacer fabric structured garment according to claim 2, comprising the steps of:
S1: cutting the shape and size of the filling cavity (2) according to the need of the garment body (1);
S2: the bonding layer is laminated on the side of the upper fixed surface (5) and the lower fixed surface (6) of the spacer fabric (3) that are away from each other to produce the bonded part;
S3: according to the specifications of the upper fixed surface (5) of the spacer fabric (3) as well as a number of outer ring parts (8) and middle parts (9) on the lower fixed surface, the adhesive layer on the adhesive member is cut, and the location of the adhesive layer corresponding to the outer ring (8) is retained, and the location of the adhesive layer corresponding to the middle part (9) is removed;
S4: the bonding member with the cut-out bonding layer is hot pressed and laminated to the filling cavity (2) of the garment body (1);
S5: filling material is charged between the dragging units (4) through the cross section of the dragging units (4) until the spacer fabric (3) is filled;
S6: tapping the filling cavity (2) so that the filling material is evenly distributed in the filling cavity (2).

12. A method for making a spacer fabric structured garment according to claim 3, comprising the steps of:
S1: cutting the shape and size of the filling cavity (2) according to the need of the garment body (1);
S2: the bonding layer is laminated on the side of the upper fixed surface (5) and the lower fixed surface (6) of the spacer fabric (3) that are away from each other to produce the bonded part;
S3: according to the specifications of the upper fixed surface (5) of the spacer fabric (3) as well as a number of outer ring parts (8) and middle parts (9) on the lower fixed surface, the adhesive layer on the adhesive member is cut, and the location of the adhesive layer corresponding to the outer ring (8) is retained, and the location of the adhesive layer corresponding to the middle part (9) is removed;
S4: the bonding member with the cut-out bonding layer is hot pressed and laminated to the filling cavity (2) of the garment body (1);
S5: filling material is charged between the dragging units (4) through the cross section of the dragging units (4) until the spacer fabric (3) is filled;

S6: tapping the filling cavity (2) so that the filling material is evenly distributed in the filling cavity (2).

13. A method for making a spacer fabric structured garment according to claim 4, comprising the steps of:
S1: cutting the shape and size of the filling cavity (2) according to the need of the garment body (1);
S2: the bonding layer is laminated on the side of the upper fixed surface (5) and the lower fixed surface (6) of the spacer fabric (3) that are away from each other to produce the bonded part;
S3: according to the specifications of the upper fixed surface (5) of the spacer fabric (3) as well as a number of outer ring parts (8) and middle parts (9) on the lower fixed surface, the adhesive layer on the adhesive member is cut, and the location of the adhesive layer corresponding to the outer ring (8) is retained, and the location of the adhesive layer corresponding to the middle part (9) is removed;
S4: the bonding member with the cut-out bonding layer is hot pressed and laminated to the filling cavity (2) of the garment body (1);
S5: filling material is charged between the dragging units (4) through the cross section of the dragging units (4) until the spacer fabric (3) is filled;
S6: tapping the filling cavity (2) so that the filling material is evenly distributed in the filling cavity (2).

14. A method for making a spacer fabric structured garment according to claim 5, comprising the steps of:
S1: cutting the shape and size of the filling cavity (2) according to the need of the garment body (1);
S2: the bonding layer is laminated on the side of the upper fixed surface (5) and the lower fixed surface (6) of the spacer fabric (3) that are away from each other to produce the bonded part;
S3: according to the specifications of the upper fixed surface (5) of the spacer fabric (3) as well as a number of outer ring parts (8) and middle parts (9) on the lower fixed surface, the adhesive layer on the adhesive member is cut, and the location of the adhesive layer corresponding to the outer ring (8) is retained, and the location of the adhesive layer corresponding to the middle part (9) is removed;
S4: the bonding member with the cut-out bonding layer is hot pressed and laminated to the filling cavity (2) of the garment body (1);
S5: filling material is charged between the dragging units (4) through the cross section of the dragging units (4) until the spacer fabric (3) is filled;
S6: tapping the filling cavity (2) so that the filling material is evenly distributed in the filling cavity (2).

15. A method for making a spacer fabric structured garment according to claim 6, comprising the steps of:
S1: cutting the shape and size of the filling cavity (2) according to the need of the garment body (1);
S2: the bonding layer is laminated on the side of the upper fixed surface (5) and the lower fixed surface (6) of the spacer fabric (3) that are away from each other to produce the bonded part;
S3: according to the specifications of the upper fixed surface (5) of the spacer fabric (3) as well as a number of outer ring parts (8) and middle parts (9) on the lower fixed surface, the adhesive layer on the adhesive member is cut, and the location of the adhesive layer corresponding to the outer ring (8) is retained, and the location of the adhesive layer corresponding to the middle part (9) is removed;
S4: the bonding member with the cut-out bonding layer is hot pressed and laminated to the filling cavity (2) of the garment body (1);
S5: filling material is charged between the dragging units (4) through the cross section of the dragging units (4) until the spacer fabric (3) is filled;
S6: tapping the filling cavity (2) so that the filling material is evenly distributed in the filling cavity (2).

16. A method for making a spacer fabric structured garment according to claim 7, comprising the steps of:
S1: cutting the shape and size of the filling cavity (2) according to the need of the garment body (1);
S2: the bonding layer is laminated on the side of the upper fixed surface (5) and the lower fixed surface (6) of the spacer fabric (3) that are away from each other to produce the bonded part;
S3: according to the specifications of the upper fixed surface (5) of the spacer fabric (3) as well as a number of outer ring parts (8) and middle parts (9) on the lower fixed surface, the adhesive layer on the adhesive member is cut, and the location of the adhesive layer corresponding to the outer ring (8) is retained, and the location of the adhesive layer corresponding to the middle part (9) is removed;
S4: the bonding member with the cut-out bonding layer is hot pressed and laminated to the filling cavity (2) of the garment body (1);
S5: filling material is charged between the dragging units (4) through the cross section of the dragging units (4) until the spacer fabric (3) is filled;
S6: tapping the filling cavity (2) so that the filling material is evenly distributed in the filling cavity (2).

17. A method for making a spacer fabric structured garment according to claim 8, comprising the steps of:
S1: cutting the shape and size of the filling cavity (2) according to the need of the garment body (1);
S2: the bonding layer is laminated on the side of the upper fixed surface (5) and the lower fixed surface (6) of the spacer fabric (3) that are away from each other to produce the bonded part;
S3: according to the specifications of the upper fixed surface (5) of the spacer fabric (3) as well as a number of outer ring parts (8) and middle parts (9) on the lower fixed surface, the adhesive layer on the adhesive member is cut, and the location of the adhesive layer corresponding to the outer ring (8) is retained, and the location of the adhesive layer corresponding to the middle part (9) is removed;
S4: the bonding member with the cut-out bonding layer is hot pressed and laminated to the filling cavity (2) of the garment body (1);
S5: filling material is charged between the dragging units (4) through the cross section of the dragging units (4) until the spacer fabric (3) is filled;
S6: tapping the filling cavity (2) so that the filling material is evenly distributed in the filling cavity (2).

18. A method for making a spacer fabric structured garment according to claim 9, comprising the steps of:
S1: cutting the shape and size of the filling cavity (2) according to the need of the garment body (1);
S2: the bonding layer is laminated on the side of the upper fixed surface (5) and the lower fixed surface (6) of the spacer fabric (3) that are away from each other to produce the bonded part;
S3: according to the specifications of the upper fixed surface (5) of the spacer fabric (3) as well as a number of outer ring parts (8) and middle parts (9) on the lower fixed surface, the adhesive layer on the adhesive member is cut, and the location of the adhesive layer corresponding to the outer ring (8) is retained, and the location of the adhesive layer corresponding to the middle part (9) is removed;

S4: the bonding member with the cut-out bonding layer is hot pressed and laminated to the filling cavity (2) of the garment body (1);

S5: filling material is charged between the dragging units (4) through the cross section of the dragging units (4) until the spacer fabric (3) is filled;

S6: tapping the filling cavity (2) so that the filling material is evenly distributed in the filling cavity (2).

19. The spacer fabric structured garment according to claim 5, wherein: a density of the middle part (9) is lower than a density of the outer ring part (8).

20. The spacer fabric structured garment according to claim 5, wherein: the middle part (9) is made of a material which is the same as a material of the outer ring part (8).

* * * * *